(12) United States Patent
Kim et al.

(10) Patent No.: US 12,235,532 B2
(45) Date of Patent: Feb. 25, 2025

(54) LIQUID CRYSTAL DISPLAY DEVICE

(71) Applicant: LG Display Co., Ltd, Seoul (KR)

(72) Inventors: Eun-Ju Kim, Paju-si (KR); Woo-Yong Noh, Paju-si (KR); Jong-Hong Shin, Paju-si (KR)

(73) Assignee: LG Display Co., Ltd, Seoul (KR)

( * ) Notice: Subject to any disclaimer, the term of this patent is extended or adjusted under 35 U.S.C. 154(b) by 185 days.

(21) Appl. No.: 17/969,649

(22) Filed: Oct. 19, 2022

(65) Prior Publication Data

US 2023/0204994 A1 Jun. 29, 2023

(30) Foreign Application Priority Data

Dec. 28, 2021 (KR) .................. 10-2021-0189358

(51) Int. Cl.
*G02F 1/1333* (2006.01)
*G02F 1/13357* (2006.01)

(52) U.S. Cl.
CPC .. *G02F 1/133317* (2021.01); *G02F 1/133322* (2021.01); *G02F 1/133606* (2013.01)

(58) Field of Classification Search
CPC ................................. G02F 1/133317
See application file for complete search history.

(56) References Cited

U.S. PATENT DOCUMENTS

| 6,593,979 B1* | 7/2003 | Ha ............... G02F 1/133308 |
| | | 349/56 |
| 2014/0354916 A1* | 12/2014 | Kuroyanagi ........ H04N 5/64 |
| | | 349/58 |
| 2016/0316583 A1* | 10/2016 | Bang ............ G02F 1/133308 |
| 2022/0229327 A1* | 7/2022 | Kang ............. G02F 1/13332 |

FOREIGN PATENT DOCUMENTS

| KR | 10-2008-0109518 A | 12/2008 |
| KR | 10-2013-0049574 A | 5/2013 |
| KR | 20210049578 A | 5/2021 |

* cited by examiner

*Primary Examiner* — Edmond C Lau
(74) *Attorney, Agent, or Firm* — Seed IP Law Group LLP

(57) ABSTRACT

A liquid display device includes a cover bottom including a first cover portion of a first direction and a second cover portion of a second direction; a backlight over the cover bottom and including a light source, a diffusion plate, and an optical sheet; a support member maintaining a distance between the light source and the diffusion plate and including a first support portion and a second support portion; and a liquid crystal panel over the backlight and the support member, wherein the support member and the cover bottom are fastened to each other by a plurality of screws, and wherein the first cover portion includes a plurality of protrusions protruding outward from an outer surface of the second cover portion and corresponding to the plurality of screws, respectively.

23 Claims, 11 Drawing Sheets

LIQUID CRYSTAL DISPLAY DEVICE

CROSS-REFERENCE TO RELATED APPLICATION

The present application claims the priority of Korean Patent Application No. 10-2021-0189358 filed on Dec. 28, 2021, which is hereby incorporated by reference in its entirety.

BACKGROUND

Technical Field

The present disclosure relates to a display device, and more particularly, to a liquid crystal display device having a narrow bezel.

Description of the Related Art

As the information society is in progress, a demand for display devices that display images increases in various forms, and flat panel display devices (FPD) such as liquid crystal display (LCD) devices and organic light emitting diode (OLED) display devices have been developed and applied to various fields.

Among the flat panel display devices, liquid crystal display devices have been widely used because of their compact size, light weight, thin thickness, low power driving, and the like.

The liquid crystal display devices use optical anisotropy and dielectric anisotropy of liquid crystal and include two substrates, a liquid crystal layer between the two substrates, and a pixel electrode and a common electrode for driving liquid crystal molecules of the liquid crystal layer. The liquid crystal display devices control the arrangement of the liquid crystal molecules by an electric field generated by applying a voltage to the pixel electrode and the common electrode and display images by the light transmittance changed accordingly. The liquid crystal display devices have been widely applied to portable devices such as cellphones or multimedia devices, monitors for notebooks or computers, and large televisions.

In the liquid crystal display devices, an area other than a display area where an image is displayed becomes a bezel of products using the liquid crystal display devices. Recently, by minimizing a width of the bezel such that the display area is maximized in the display device having the same size, borderless products have been researched and developed with a neat appearance in which mechanical parts such as various cases or covers are not shown.

To do this, structures have been suggested in which an adhesive member is used between components of the liquid crystal display device, and the adhesive member fixes the components by a strong adhesive force.

BRIEF SUMMARY

The inventors have realized that, when adhesion failure occurs or the components need to be repaired, it is difficult to separate the components because of the strong adhesive force of the adhesive member. Accordingly, in the process of separating the components, damage to a liquid crystal panel or optical sheets of a backlight unit is likely, so that repair and reassembly are difficult.

Accordingly, the present disclosure is directed to a liquid crystal display device that substantially obviates one or more of the problems due to limitations and disadvantages described above to a liquid crystal display device with a minimized or reduced bezel.

More specifically, the present disclosure is to provide a liquid crystal display device with a minimized or reduced bezel.

The present disclosure is also to provide a liquid crystal display device that is easy to be repaired and reassembled.

Additional features and aspects will be set forth in the description that follows, and in part will be apparent from the description, or may be learned by practice of the present disclosure provided herein. Other features and aspects of the disclosed concepts may be realized and attained by the structure particularly pointed out in the written description, or derivable therefrom, and the claims hereof as well as the appended drawings.

To achieve these and other aspects of the present disclosure, as embodied and broadly described herein, a liquid display device includes a cover bottom including a first cover portion that extends in a first direction and a second cover portion that extends in a second direction; a backlight over the cover bottom and including a light source, a diffusion plate, and an optical sheet; a support member that maintains a distance between the light source and the diffusion plate and includes a first support portion and a second support portion; and a liquid crystal panel over the backlight and the support member, wherein the support member and the cover bottom are fastened to each other by a plurality of screws, and wherein the first cover portion includes a plurality of protrusions that protrude outward from an outer surface of the second cover portion and correspond to the plurality of screws, respectively.

In accordance with various embodiments, a display device includes a cover bottom, and a support member on the cover bottom. The support member includes a first support portion that extends in a horizontal direction, and a second support portion that extends in a vertical direction. The display device further includes a backlight including a light source under the first support portion, and a diffusion plate over the first support portion. A display panel is over the backlight and the support member, and a screw fastens the support member to the cover bottom.

In accordance with various embodiments, a display device includes a cover bottom, a backlight, a support member, a display panel and a screw. The cover bottom includes: a first cover portion that extends in a first direction, the first cover portion having a protrusion; a second cover portion that extends in a second direction; and a cover groove that separates the second cover portion from the protrusion. The backlight is over the cover bottom and includes a light source, a diffusion plate, and an optical sheet. The support member maintains a selected distance between the light source and the diffusion plate, and includes a support hole that overlaps the protrusion. The display panel is over the backlight and the support member. The screw extends through the support hole and fastens the support member to the cover bottom.

It is to be understood that both the foregoing general description and the following detailed description are example explanatory and are intended to provide further explanation of the disclosed concepts as claimed.

BRIEF DESCRIPTION OF THE SEVERAL VIEWS OF THE DRAWINGS

The accompanying drawings, which are included to provide a further understanding of the present disclosure and which are incorporated in and constitute a part of this application, illustrate aspects of the disclosure and together with the description serve to explain various principles of the present disclosure.

In the drawings.

DETAILED DESCRIPTION

Reference will now be made in detail to aspects of the disclosure, an example embodiment of which is illustrated in the accompanying drawings.

Figure 1:
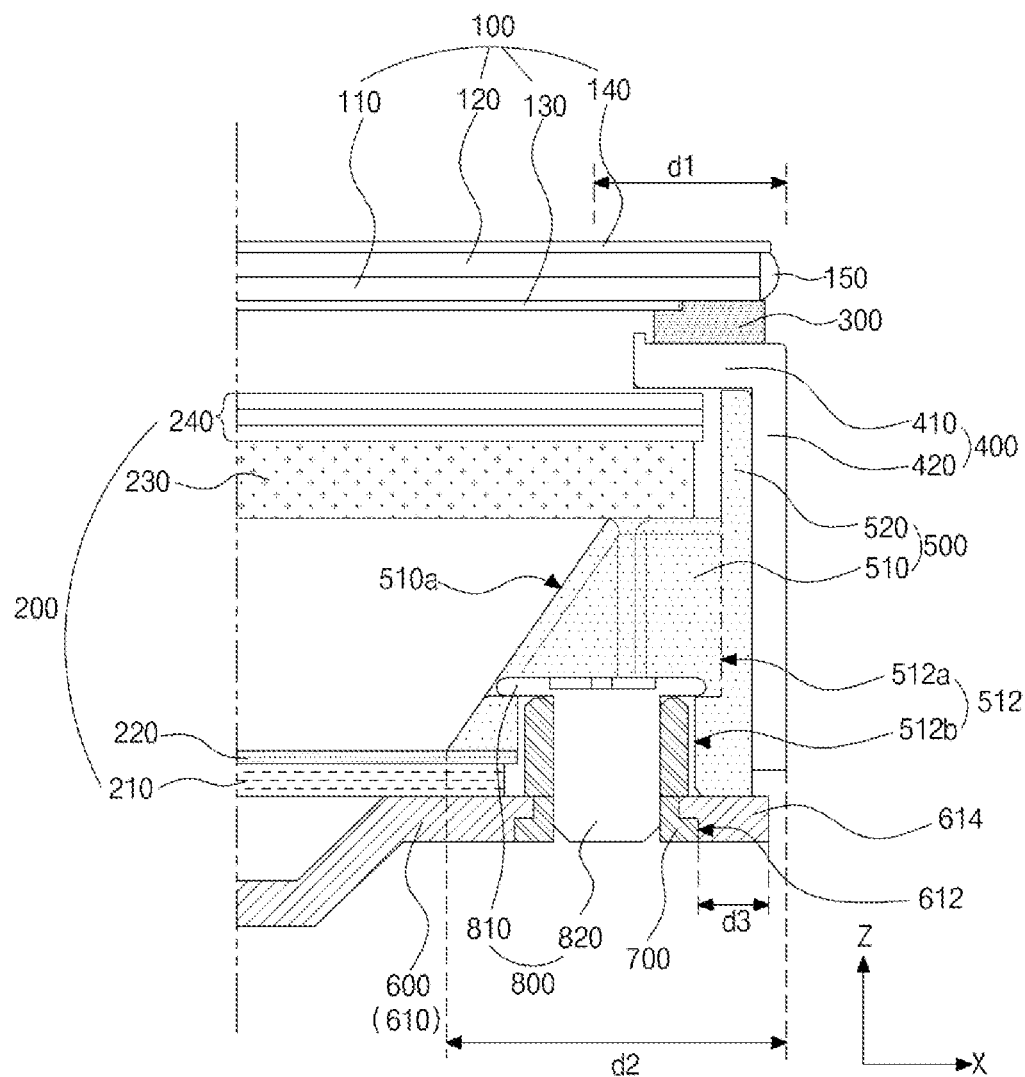
FIG. 1 is a schematic cross-sectional view of a liquid crystal display device according to an embodiment of the present disclosure.
Figure 2:
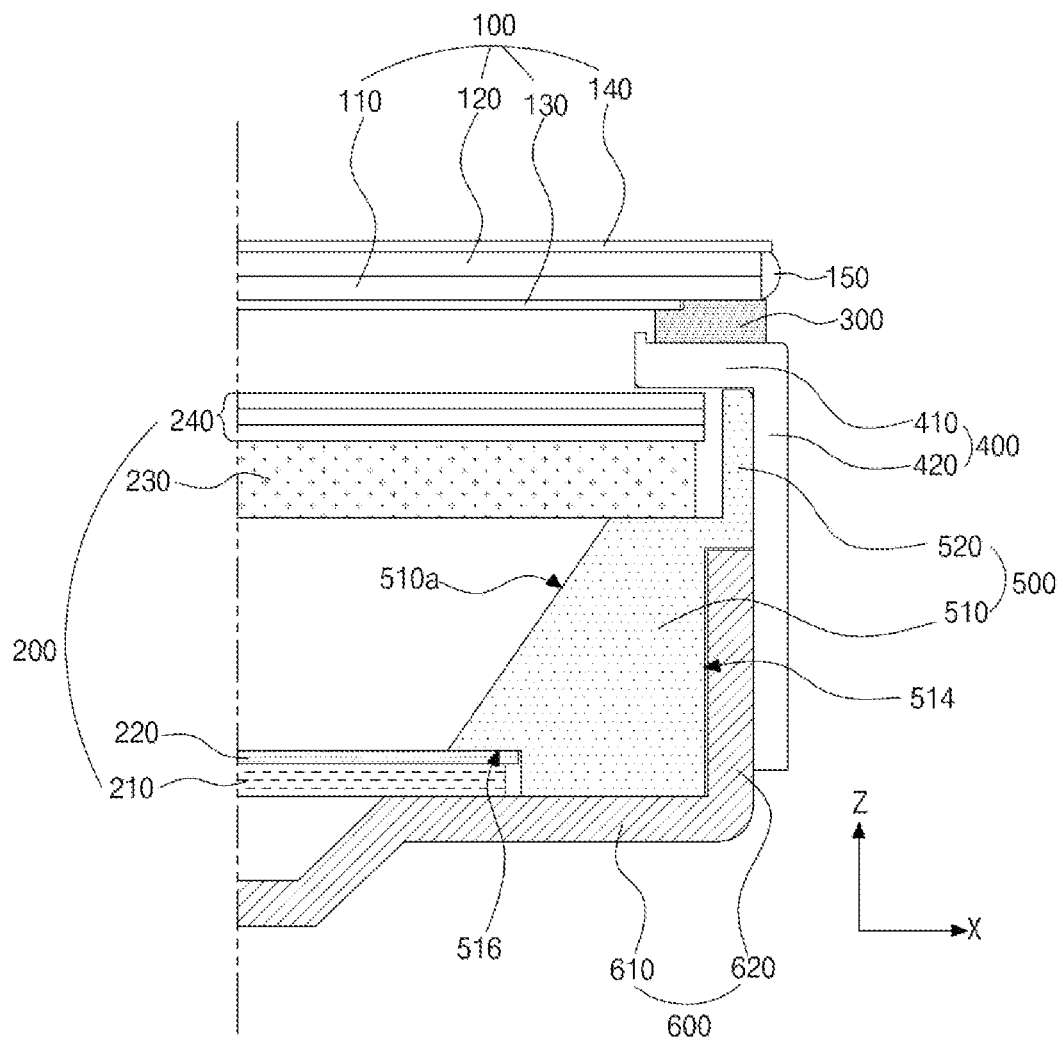
FIG. 2 is a schematic cross-sectional view of another part of the liquid crystal display device according to the embodiment of the present disclosure.
Figure 3:
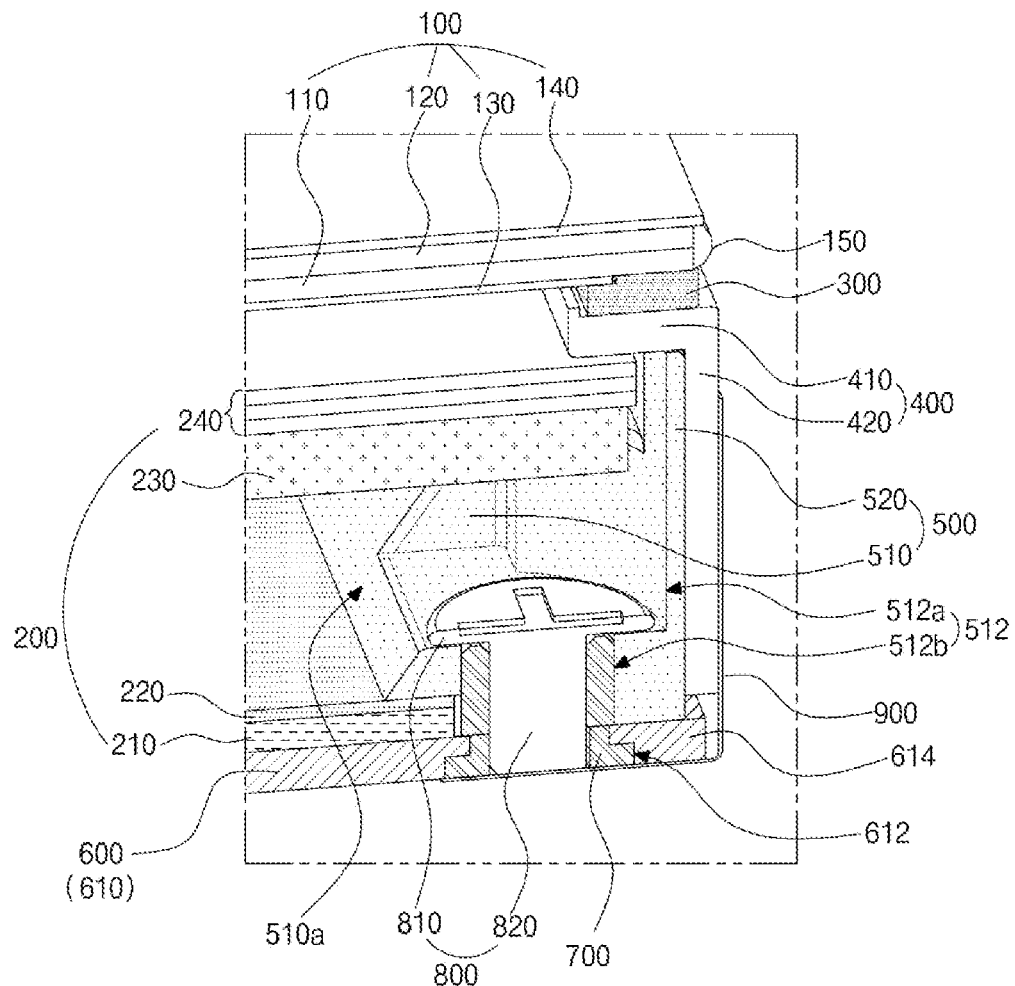
FIG. 3 is a top perspective view of the liquid crystal display device according to the embodiment of the present disclosure.
Figure 4:
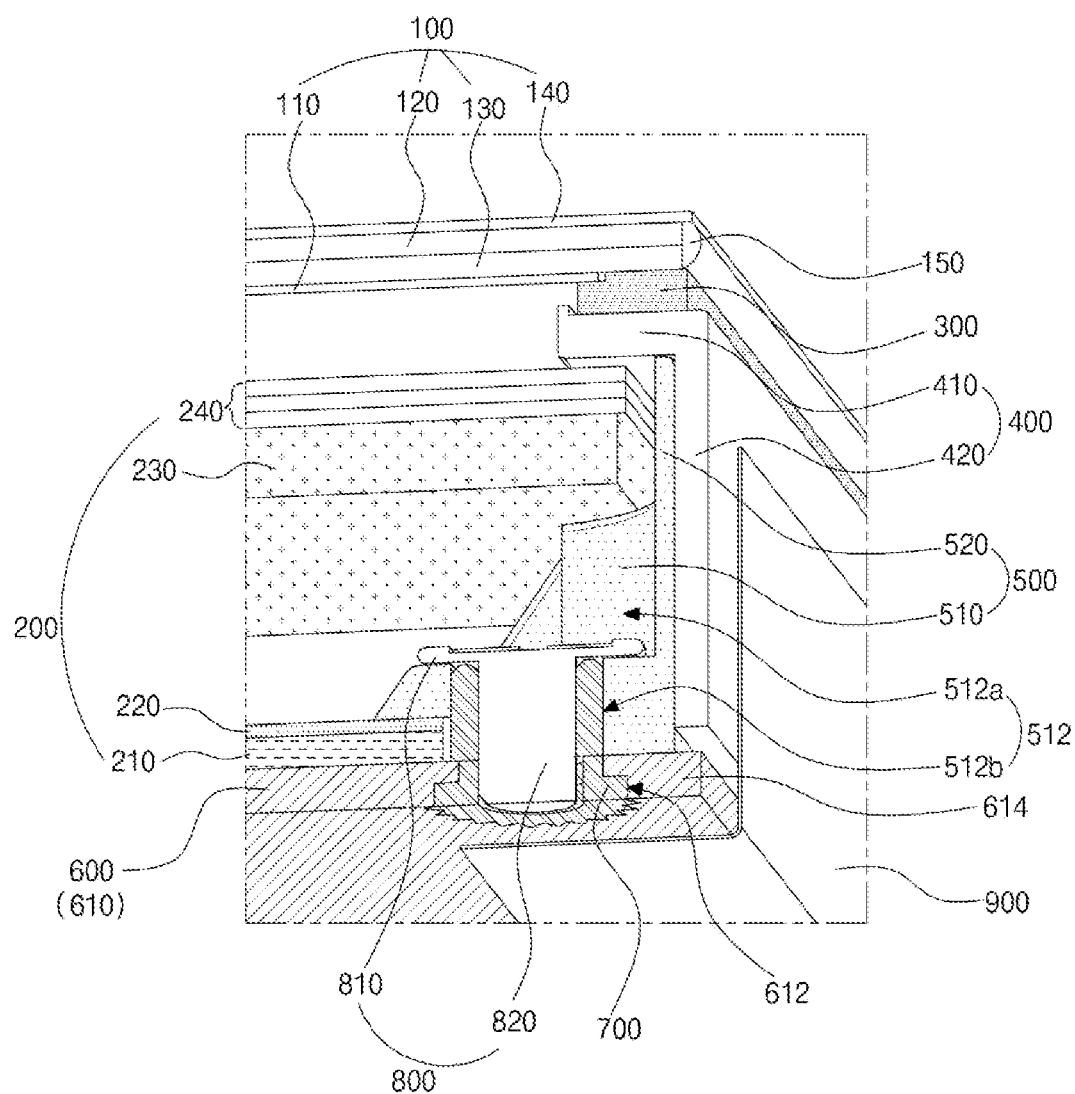
FIG. 4 is a bottom perspective view of the liquid crystal display device according to the embodiment of the present disclosure.

FIG. 1 and FIG. 2 are schematic cross-sectional views of a display device, which may be a liquid crystal display device, according to an embodiment of the present disclosure, FIG. 3 is a top perspective view of the liquid crystal display device according to the embodiment of the present disclosure, and FIG. 4 is a bottom perspective view of the liquid crystal display device according to the embodiment of the present disclosure. Here, FIGS. 1, 3, and 4 show a part with a screw joint structure, and FIG. 2 shows a part without a screw joint structure.

Figure 5:
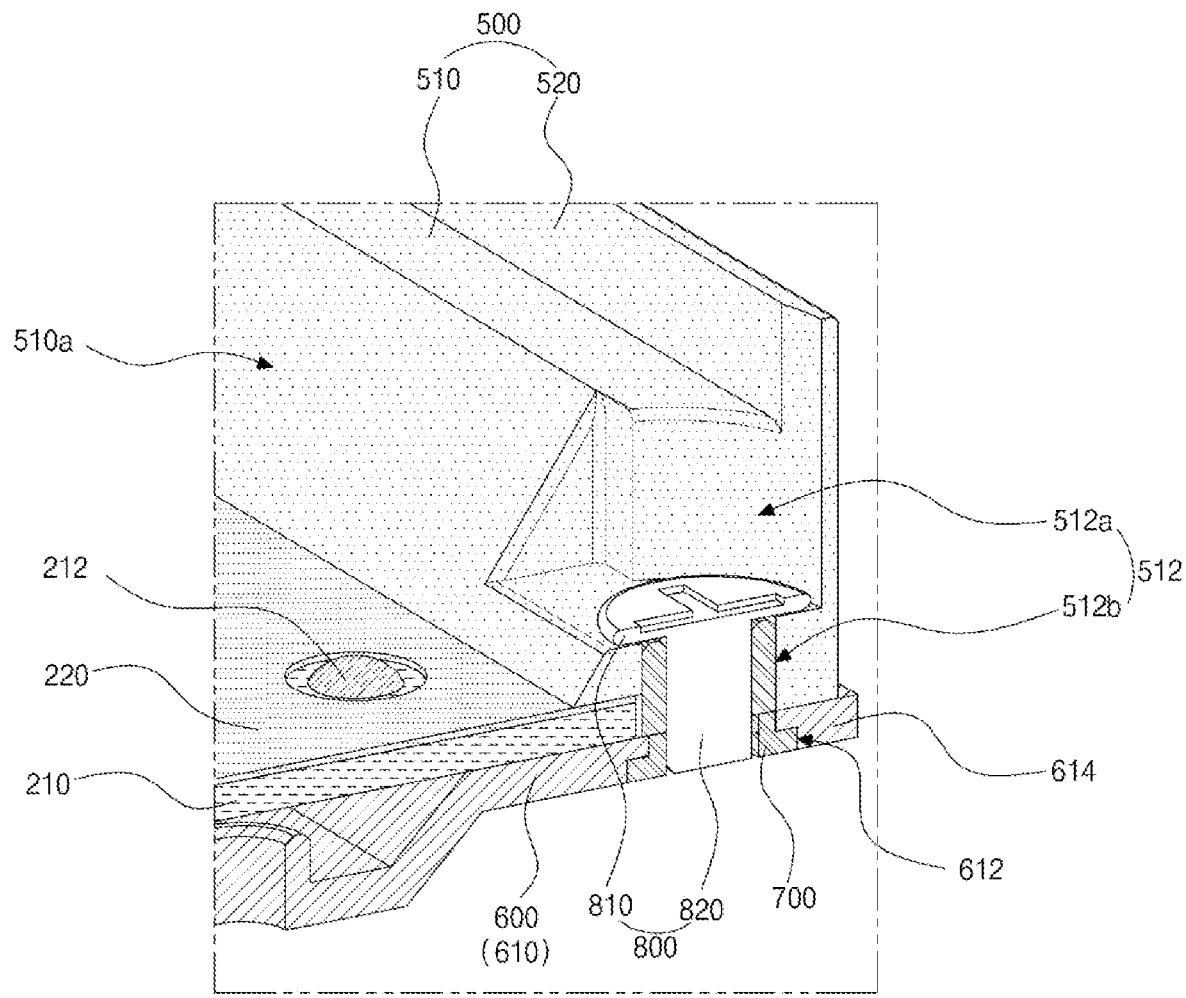
FIG. 5 is a top perspective view schematically showing a configuration between a cover bottom and a support main of the liquid crystal display device according to the embodiment of the present disclosure.
Figure 6:
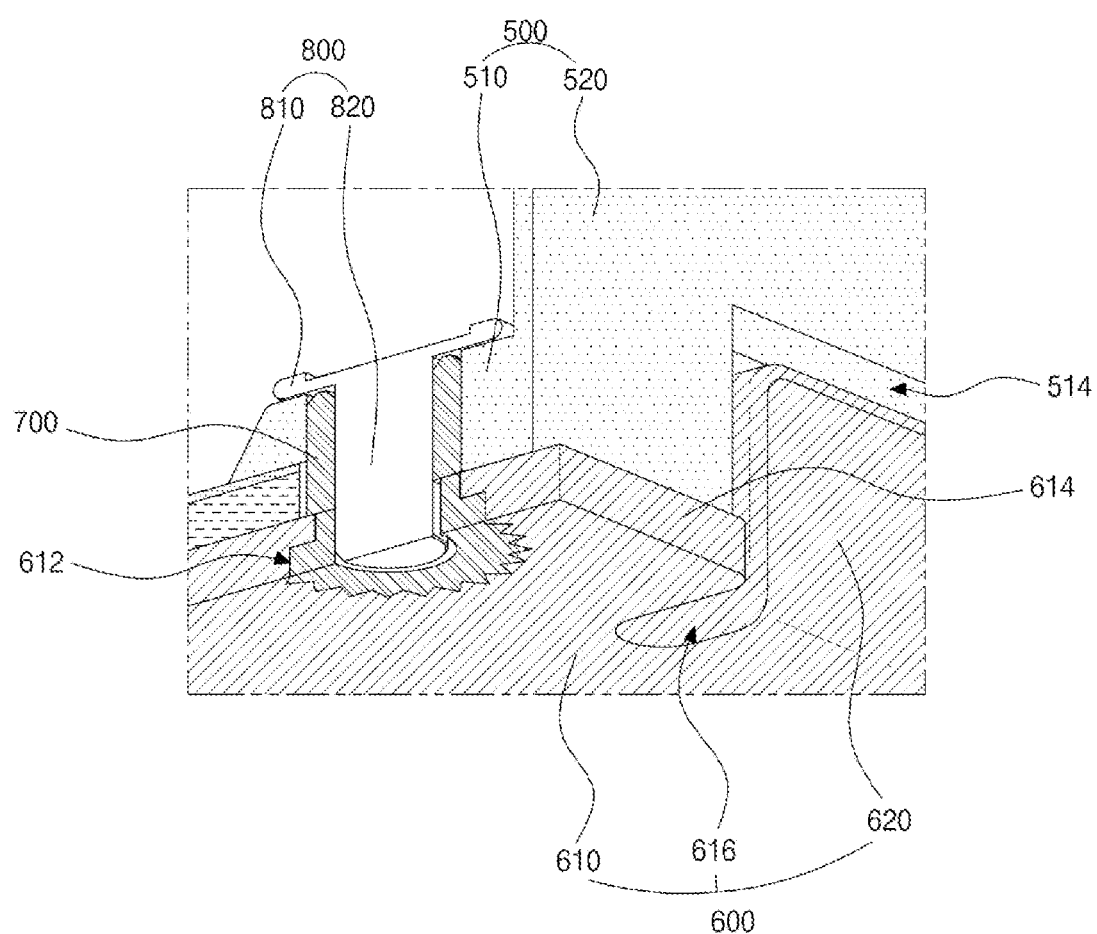
FIG. 6 is a bottom perspective view schematically showing the configuration between the cover bottom and the support main of the liquid crystal display device according to the embodiment of the present disclosure.

Further, FIG. 5 and FIG. 6 are a top perspective view and a bottom perspective view schematically showing a configuration between a cover bottom and a support main of the liquid crystal display device according to the embodiment of the present disclosure, respectively, and show the part with the screw joint structure.

As shown in FIGS. 1 to 6, the liquid crystal display device according to the embodiment of the present disclosure includes a display panel 100, which may be a liquid crystal panel 100, and a backlight unit or structure 200, an adhesive member 300, a guide panel 400, a support main 500, and a cover bottom 600. The support main 500 and the cover bottom 600 are combined with each other by a screw 800 that fastens the support main 500 to the cover bottom 600. The support main 500 is a structural member that provides support to the cover bottom and the display device. It can also be referred to as a support member, which has the same meaning.

The liquid crystal panel 100 includes a first substrate 110 in a lower position and a second substrate 120 in an upper position, and a liquid crystal layer (not shown) is interposed between the first and second substrates 110 and 120. As shown in FIG. 1, the lower position is more proximal the cover bottom 600 than the upper position.

Although not shown in the figures, the first substrate 110 includes a plurality of gate lines and a plurality of data lines on an inner surface thereof, and the gate lines and the data lines cross each other at a plurality of pixel regions. In each pixel region, a thin film transistor, a pixel electrode, and a common electrode are provided. The thin film transistor is connected to the corresponding gate line and the corresponding data line, and the pixel electrode is connected to the thin film transistor. The pixel electrode and the common electrode generate an electric field to drive liquid crystal molecules of the liquid crystal layer. This first substrate 110 may be referred to as an array substrate.

In addition, although not shown in the figures, the second substrate 120 includes a black matrix, a color filter layer, and an overcoat layer on an inner surface thereof. The color filter layer includes red, green, and blue color filters, and the black matrix has openings corresponding to respective pixel regions. The red, green, and blue color filters of the color filter layer are disposed to correspond to the opening, respectively. This second substrate 120 may be referred to as a color filter substrate.

A side sealing member 150 is provided at side surfaces of the first and second substrates 110 and 120. The side sealing member 150 may be formed of a material that absorbs light.

The side sealing member 150 can prevent or reduce light leakage occurring at side surfaces of the liquid crystal panel 100. More specifically, some of light outputted from the liquid crystal panel 100 travels toward the side surfaces of the liquid crystal panel 100, and the side sealing member 150 is provided at the side surfaces of the liquid crystal panel 100, thereby blocking the light leakage due to the light traveling toward the side surfaces of the liquid crystal panel 100.

In addition, the side sealing member 150 protects the side surfaces of the liquid crystal panel 100 from external impacts.

The liquid crystal panel 100 further includes a first polarizer 130 and a second polarizer 140. The first polarizer 130 is attached to an outer surface of the first substrate 110, that is, a lower surface of the first substrate 110, and the second polarizer 140 is attached to an outer surface of the second substrate 120, that is, an upper surface of the second substrate 120 in the context of the figures. In the figures, the first polarizer 130 is disposed under the first substrate 110, and the second polarizer 140 is disposed over the second substrate 120. The first polarizer 130 and the second polarizer 140 transmit linearly-polarized light only parallel to respective transmission axes. The transmission axis of the first polarizer 130 is perpendicular to the transmission axis of the second polarizer 140.

Here, a size of the second polarizer 140 is larger than a size of the first polarizer 130. Accordingly, the first polarizer 130 may be spaced apart from the side sealing member 150, and the second polarizer 140 may be in contact with the side sealing member 150.

Further, the size of the first polarizer 130 is smaller than a size of the first substrate 110, and the outer surface of the first substrate 110 is partially exposed. More specifically, the outer surface of the first substrate 110 is exposed between an edge of the first polarizer 130 and an edge of the first substrate 110.

The backlight unit 200 is disposed under the liquid crystal panel 100 to provide light to the liquid crystal panel 100. The backlight unit 200 includes a light emitting diode (LED) array 210, a reflection plate 220, a diffusion plate 230, and an optical sheet 240.

The backlight unit 200 is a direct type in which the LED array 210 of a light source is disposed directly under the liquid crystal panel 100.

The LED array 210 may include a plurality of LEDs 212 (see FIG. 5) provided on a printed circuit board (PCB). Here, each LED 212 may be a mini LED having a size of 100 to 200 µm. Accordingly, by implementing local dimming in which light is selectively provided to the liquid crystal panel 100 by zones, the black luminance is improved, so that the contrast ratio can be increased and the power consumption can be decreased. However, the present disclosure is not limited thereto, and various sizes and types of LEDs can be applied.

The reflection plate 220 is provided on the LED array 210. The reflection plate 220 has openings corresponding to the LEDs 212, and the LEDs 212 are arranged in the respective openings. For example, as shown in FIG. 5, the LED 212 may be positioned such that the LED 212 extends through and protrudes above an opening in the reflection plate 220. Accordingly, light from the LEDs 212 travels toward the liquid crystal panel 100, and light reflected by the liquid crystal panel 100 or other components over the LEDs 212 and traveling toward the reflection plate 220 is reflected by the reflection plate 220 again and then is sent back to the liquid crystal panel 100, thereby increasing the light efficiency.

The diffusion plate 230 is disposed over the reflection plate 220. The diffusion plate 230 is spaced apart from the LED array 210 and the reflection plate 220 with a predetermined or selected distance and uniformly diffuses light from the LEDs 212.

The optical sheet 240 is disposed over the diffusion plate 230. The optical sheet 240 may include at least one diffusion sheet and at least one light-concentrating sheet such that a more uniform surface light source can be incident on the liquid crystal panel 100 by diffusion or concentrating light passing through the diffusion plate 230.

For example, the optical sheet 240 may include two light-concentrating sheets and one diffusion sheet sequentially disposed over the diffusion plate 230. The light-concentrating sheets may include prism patterns or lenticular patterns. In this case, one of the light-concentrating sheets may include lenticular patterns, and the other may include prism patterns.

Meanwhile, the optical sheet 240 may further include a brightness enhancement film in which layers having different refractive indexes are alternately stacked or may be the brightness enhancement film instead of the diffusion sheet.

The liquid crystal panel 100 and the backlight unit 200 are fastened and supported by the guide panel 400, the support main 500, and the cover bottom 600.

First, the liquid crystal panel 100 is fastened on the guide panel 400. The guide panel 400 may be formed along edges of the liquid crystal panel 100, thereby having a plane structure of a substantially square or rectangular frame shape.

The guide panel 400 includes a first guide portion 410 and a second guide portion 420. The first guide portion 410 may be a horizontal portion extending in an X direction, and the second guide portion 420 may be a vertical portion extending in a Z direction. One side end of the first guide portion 410 may be connected to an upper end of the second guide portion 420, and the guide panel 400 may have a substantially L-shaped cross-section. Meanwhile, the other side end of the first guide portion 410 may protrude toward the Z direction. That is, the first guide portion 410 may have a protrusion at the other side end. It should be understood that "connected to" includes the meaning of being integrally formed with, without requiring a connector or interface therebetween. For example, as shown in FIG. 1, the first guide portion 410 and the second guide portion 420 are an integrally-formed, continuous structure without a visible interface therebetween.

The adhesive member 300 is provided between the first guide portion 410 of the guide panel 400 and the liquid crystal panel 100, so that the liquid crystal panel 100 may be fixed to the first guide portion 410 by the adhesive member 300.

In this case, the adhesive member 300 overlaps and contacts the exposed lower surface of the first substrate 110 and also overlaps and contacts the first polarizer 130. The adhesive member 300 may be a foam pad having a cushioned property, and thus, the adhesive member 300 may act as a buffer absorbing external impacts. The adhesive member 300 may be formed of an elastic material and for example, may be formed of polyethylene, polyacryl, or polyurethane. However, the present disclosure is not limited thereto.

The support main 500 is disposed under the guide panel 400. The support main 500 may be formed along the edges of the liquid crystal panel 100, thereby having a plane structure (i.e., a cross-sectional profile in the X-Y plane) of a substantially square or rectangular frame shape. The support main 500 includes a first support portion 510 and a second support portion 520. It should be understood that "formed along the edges" includes the meaning that the support main 500 is a separate structure from the liquid crystal panel 100, and is positioned underlying edge regions, namely at the outer perimeter, of the liquid crystal panel 100 (see FIG. 1, for example).

The first support portion 510 is disposed between the reflection plate 220 and the diffusion plate 230. The second support portion 520 extends from an upper surface of an edge of the first support portion 510 toward the Z direction and is adjacent to the side surfaces of the diffusion plate 230 and the optical sheet 240. The second support portion 520 is disposed between the side surfaces of the diffusion plate 230 and the optical sheet 240 and the second guide portion 420 of the guide panel 400.

The first support portion 510 maintains a certain or selected distance between the LED array 210 and the diffusion plate 230 so that light from the LEDs 212 may be mixed to implement uniform surface light source.

The diffusion plate 230 is disposed on the first support portion 510. Accordingly, the diffusion plate 230 and the optical sheet 240 are disposed between the first support portion 510 and the first guide portion 410, and the upper surface of the first support portion 510 is in contact with a lower surface of the diffusion plate 230, thereby supporting the diffusion plate 230 and the optical sheet 240.

An outer surface of the first support portion 510 is adjacent to the second guide portion 420 of the guide panel 400 and is surrounded by the second guide portion 420 on at least four sides. An inner surface of the first support portion 510 has an inclination. That is, the first support portion 510 has an inclined surface 510a on the inner side.

The inclined surface 510a reflects light from the LEDs 212 and sends the reflected light to the diffusion plate 230.

In addition, the first support portion 510 has a support hole 512, a first support groove 514, and a second support groove 516.

The support hole 512 is provided to correspond to the screw 800. The support hole 512 includes a first hole part 512a in which a screw head 810 is disposed and a second hole part 512b in which a screw body 820 is disposed. An area of the first hole part 512a is larger than an area of the second hole part 512b on a planar view. At this time, the first hole part 512a is extended into the inclined surface 510a and its inner side is opened, as shown in FIG. 3. The support hole 512 is substantially provided in the inner surface and the upper surface of the first support portion 510. It should be understood that "opened" or "open" includes the meaning that a hole in a structure extends through, and forms an opening in, at least one wall or surface of the structure. For example, as shown in FIG. 3, the first hole part 512a extends through, and forms an opening in, the inclined surface 510a of the first support portion 510.

The first support groove 514 (see FIG. 2) is provided in the outer surface of the first support portion 510 and is disposed under the second support portion 520. The first support groove 514 is provided in a portion where the screw 800 is not disposed. That is, the first support groove 514 is spaced apart from the support hole 512 and is provided in the first support portion 510. A second cover portion 620 of the cover bottom 600 is disposed in the first support groove 514.

The second support groove 516 is provided on a lower side of the inclined surface 510a of the first support portion 510. Edges of the LED array 210 and the reflection plate 220 are disposed in the second support groove 516, and the first support portion 510 presses and fastens the edges of the LED array 210 and the reflection plate 220, thereby preventing them from being separated. Accordingly, it is not necessary to provide an additional structure for preventing the separation of the reflection plate 220 from the LED array 210.

The support main 500 may be formed of plastic and may be molded. For example, the support main 500 may be formed of white polycarbonate (PC), but is not limited thereto.

The cover bottom 600 is provided under the support main 500. The cover bottom 600 includes a first cover portion 610 and the second cover portion 620. The first cover portion 610 is a horizontal plane and extends substantially in the X direction in the view shown in FIG. 1. At sides of the display device that are perpendicular to that shown in FIG. 1, the first cover portion 610 may extend substantially in the Y direction. The first cover portionn 610 may have at least one bent part to accommodate various components beneficial for driving the liquid crystal panel 100.

The second cover portion 620 is a vertical plane and extends in the Z direction. The second cover portion 620 is bended from the first cover portion 610. The second cover portion 620 is disposed in the first support groove 514 of the support main 500. Accordingly, the second cover portion 620 is disposed between the second guide portion 420 of the guide panel 400 and the first support portion 510 of the support main 500 to thereby prevent the support main 500 from being pushed outward. As described above, the cover bottom 600 is combined with the support main 500 through the screw 800. To do this, the first cover portion 610 of the cover bottom 600 has a cover hole 612. The cover hole 612 is disposed under the support hole 512.

Meanwhile, the cover bottom 600 has a protrusion 614 to correspond to the cover hole 612, and a cover groove 616 is provided between the protrusion 614 and the second cover portion 620. This will be described in detail later.

A press-fit nut 700, which is commonly referred to as a PEM nut, is provided in the cover hole 612. The press-fit nut 700 is also disposed in the second hole portion 512b of the support hole 512. However, the present disclosure is not limited thereto. Alternatively, a screw thread may be formed in the cover hole 612 by a tapping method instead of the press-fit nut 700.

The press-fit nut 700 is engaged with the screw 800, so that the cover bottom 600 is combined with the support main 500. In this case, the screw body 820 is disposed inside the press-fit nut 700.

Meanwhile, an adhesive tape 900 is attached to an outer surface of the second guide portion 420 of the guide panel 400 and a lower surface of the first cover portion 610 of the cover bottom 600 to fix the guide panel 400 and the cover bottom 600.

In the liquid crystal display device according to the embodiment of the present disclosure, the width of the bezel can be reduced. This will be described with reference to FIG. 1.

In FIG. 1, when an embedded screw is applied, a first distance d1 corresponding to the width of the bezel depends on a second distance d2 from the outer surface of the guide panel 400 to a bottom end of the inclined surface 510a of the support main 500. At this time, the second distance d2 is determined according to the type of screw 800 and a location of the cover hole 612 corresponding thereto. Further, in order to prevent separation of the reflection plate 220, it is additionally beneficial to maintain a certain distance between the reflection plate 220 and the support main 500. Accordingly, when the embedded screw is applied, the second distance d2 is increased.

On the other hand, when an opened screw is applied, the second distance d2 can be decreased as compared to the embedded screw because a wall enclosing the screw is not needed.

Meanwhile, the second distance d2 can be reduced, as the location of the cover hole 612 corresponding to the screw 800 is closer to the outer surface of the guide panel 400. In this case, in order to apply the press-fit nut 700 or form the screw thread by the tapping method, a third distance d3 that is a minimum or selected interval from the edge of the first cover portion 610 is beneficial. For example, the third distance d3 may be 1.5 mm, but is not limited thereto.

Accordingly, in the liquid crystal display device according to the embodiment of the present disclosure, the protrusion 614 is provided in the first cover portion 610 to correspond to the cover hole 612 so that the location of the cover hole 612 is close to the outer surface of the guide panel 400.

An edge of the protrusion 614 is disposed outside outer surfaces of the second cover portion 620 and the support main 500, and the protrusion 614 overlaps the second guide portion 420 of the guide panel 400 along the Z direction. At this time, the edge of the protrusion 614 is disposed inside the outer surface of the second guide portion 420.

As described above, in the liquid crystal display device according to the embodiment of the present disclosure, the support main 500 and the cover bottom 600 are engaged by the screw 800, so that repair and rework can be facilitated when defects or problems occur.

In addition, since the opened screw is applied and the protrusion 614 is provided in the second cover portion 620 of the cover bottom 600, the tightening position of the screw 800 can be moved as much as possible toward the guide panel 400, so that the second distance d2 can be decreased and the width d1 of the bezel can be minimized or reduced. For example, the width d1 of the bezel may be 4 mm or less, or beneficially, 3 mm or less.

In this case, a white screw may be used or white paint may be applied to the screw head 810 so that the opened screw 800 is not visibly recognized to the outside.

A detailed structure of the cover bottom and the support main of the liquid crystal display device according to the embodiment of the present disclosure will be described in detail with reference to FIGS. 7 to 11.

Figure 7:
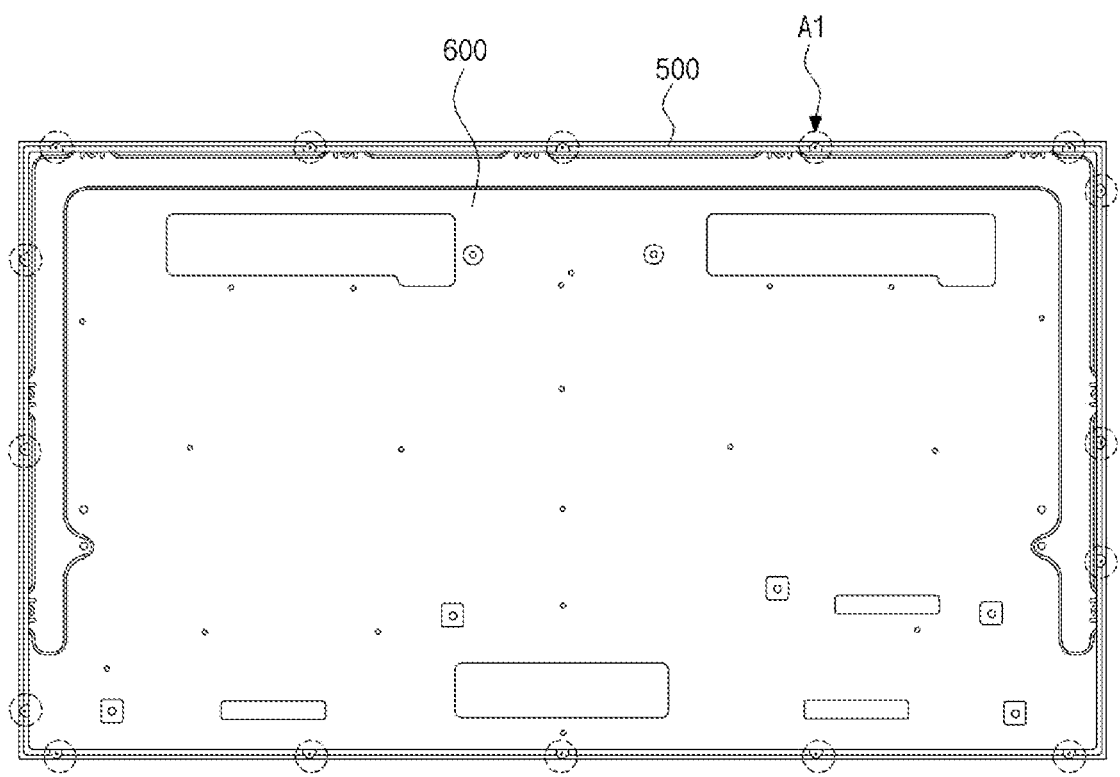
FIG. 7 is a plan view schematically illustrating a combined structure of the cover bottom and the support main of the liquid crystal display device according to the embodiment of the present disclosure.
Figure 8:
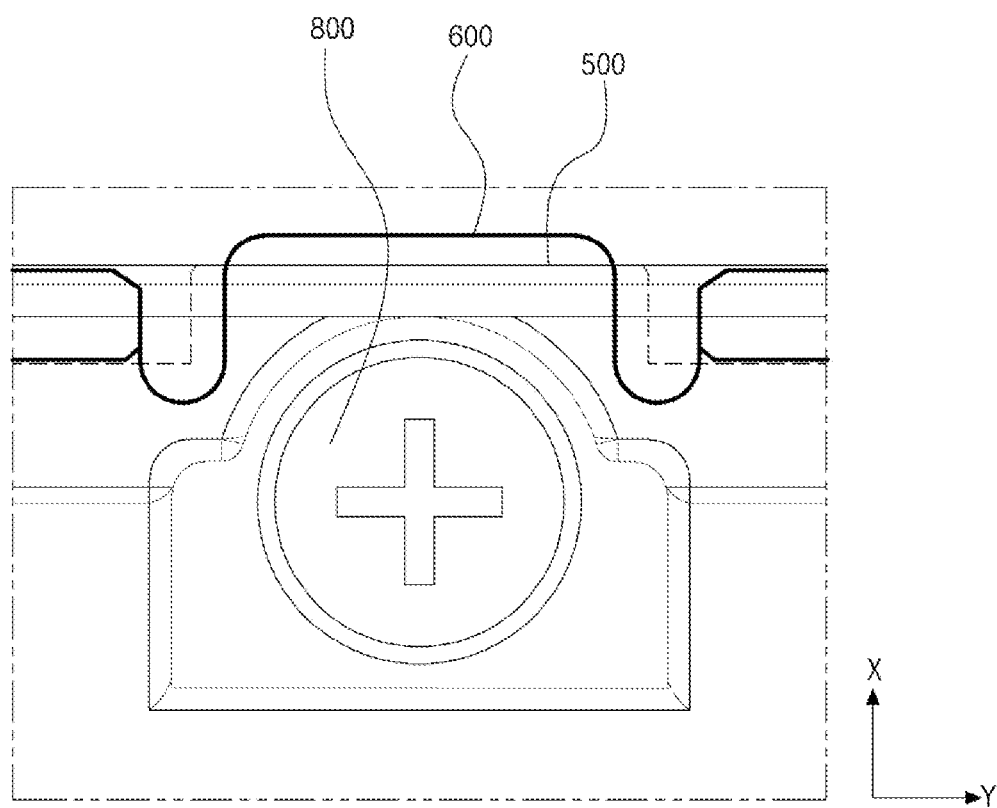
FIG. 8 is an enlarged plan view of the area A1 of FIG. 7.
Figure 9:
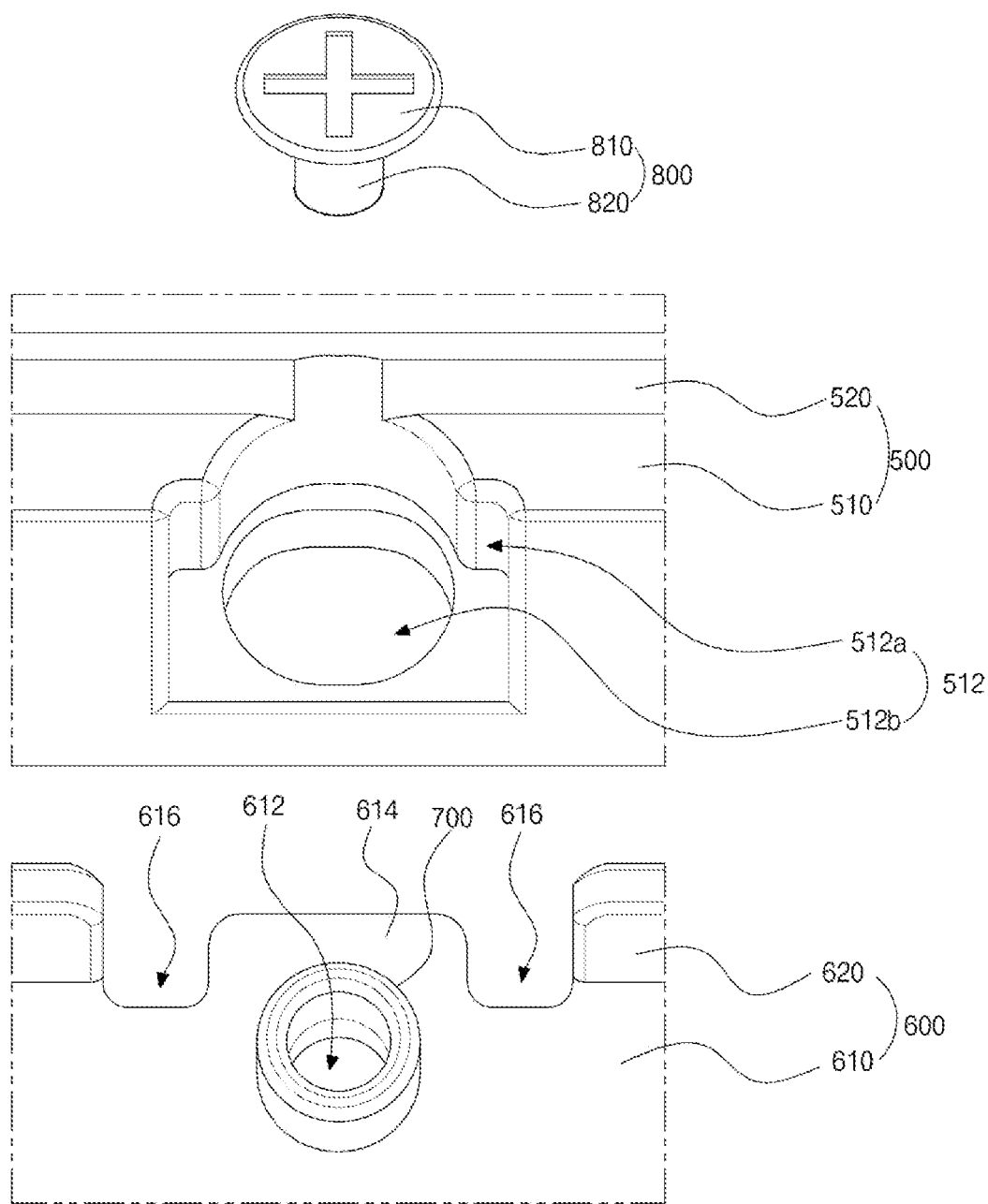
FIG. 9 is an enlarged exploded perspective view of the area A1 of FIG. 7.
Figure 10:
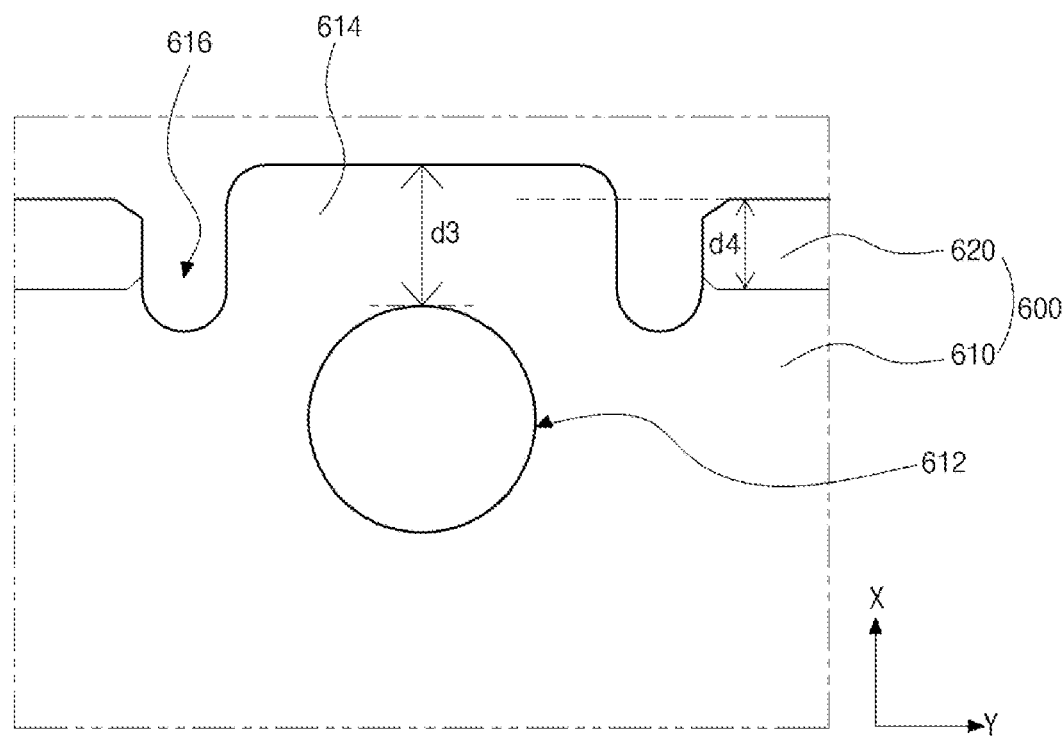
FIG. 10 is an enlarged plan view of the cover bottom according to the embodiment of the resent disclosure.
Figure 11:
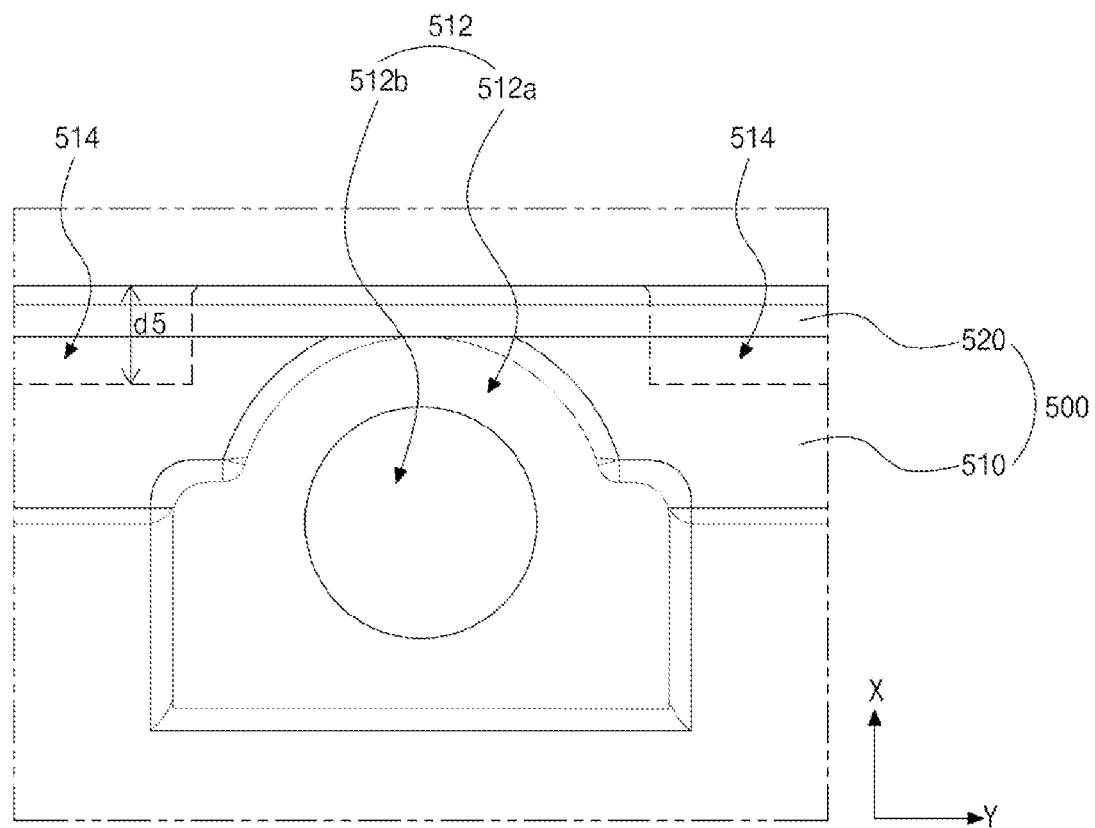
FIG. 11 is an enlarged plan view of the support main according to the embodiment of the present disclosure.

FIG. 7 is a plan view schematically illustrating a combined structure of the cover bottom and the support main of the liquid crystal display device according to the embodiment of the present disclosure, FIG. 8 is an enlarged plan view of the area A1 of FIG. 7, FIG. 9 is an enlarged exploded perspective view of the area A1 of FIG. 7, FIG. 10 is an enlarged plan view of the cover bottom according to the embodiment of the resent disclosure, and FIG. 11 is an enlarged plan view of the support main according to the embodiment of the present disclosure. In FIG. 7, the areas indicated by the dotted lines and including the area A1 represent screw-tightening parts.

In FIGS. 7 to 11, the support main 500 is disposed over the cover bottom 600. At this time, the support main 500 is disposed along the edges of the cover bottom 600.

The support main 500 and the cover bottom 600 are combined with (e.g., fastened to) each other by a plurality of screws 800. The number and position of the plurality of screws 800 are not limited as illustrated and may vary.

The cover bottom 600 includes the first cover portion 610 and the second cover portion 620, and the first cover portion 610 has the cover hole 612 with the press-fit nut 700 for tightening the screw 800 and the protrusion 614 corresponding to the cover hole 612.

Here, the cover hole 612 may not be provided in advance and may be formed in the process of applying the press-fit nut 700.

The protrusion 614 protrudes outward from the outer surface of the second cover portion 620 (see FIG. 10). In addition, the protrusion 614 also protrudes outward from the outer surface of the support main 500. In this case, the distance d3 from the cover hole 612 to the edge of the protrusion 614 in the X direction is greater than the X direction length d4 of the second cover portion 620.

The protrusion 614 is disposed between the adjacent second cover portions 620 in the Y direction. Accordingly, each second cover portion 620 is disposed between the adjacent protrusions 614 in the Y direction.

The protrusion 614 and the second cover portion 620 are spaced apart from each other, and the cover groove 616 is provided between the protrusion 614 and the second cover portion 620. The cover groove 616 may facilitate bending of the second cover portion 620.

Meanwhile, the support main 500 includes the first support portion 510 and the second support portion 520, the first support portion 510 has the support hole 512 for tightening the screw 800, and the support hole 512 has the first hole portion 512a and the second hole portion 512b.

The screw head 810 is disposed in the first hole portion 512a, and the screw body 820 is disposed in the second hole portion 512b. The screw body 820 is also disposed in the cover hole 612.

In addition, the first support portion 510 has the first support groove 514 (see FIG. 11) in the outer surface thereof under the second support portion 520, and the second cover portion 620 is disposed in the first support groove 514. The X direction length d5 of the first support groove 514 may be equal to or greater than the X direction length d4 of the second cover portion 620.

As described above, since the second cover portion 620 is disposed in the first support groove 514, the protrusion 614 is disposed between the adjacent first support grooves 514 in the Y direction. Accordingly, the first support groove 514 is disposed between the adjacent protrusions 614 in the Y direction.

The embodiments are described with reference to a liquid crystal panel 100. It should be appreciated that, in some embodiments, the display device includes a display panel 100 of a different type than the liquid crystal panel 100 described, and also includes one or more of the cover bottom 600, support member 500, and the guide member 400.

In the present disclosure, since the support main and the cover bottom are combined with each other by the screws, the repair and reassembly can be facilitated when defects occur or problems occur.

Additionally, in the present disclosure, by providing the protrusion, the screw-tightening position is moved as much as possible toward the outside, so that the width of the bezel can be minimized or reduced.

Further, since it is not necessary to provide an additional structure for preventing the separation of the reflection plate, costs can be reduced.

It will be apparent to those skilled in the art that various modifications and variations can be made in the display device of the present disclosure without departing from the technical idea or scope of the disclosure. Thus, it is intended that the present disclosure cover the modifications and variations of this disclosure provided they come within the scope of the appended claims and their equivalents.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A liquid display device, comprising:
   a cover bottom including:
      a first cover portion that extends in a first direction along a first plane, the first cover portion including a plurality of protrusions that extend in the first plane; and
      a second cover portion coupled to the first cover portion and that extends in a second direction along a second plane transverse to the first plane, the second cover portion including an outer surface in the second plane, an end at least one of the plurality of protrusions extends past the outer surface of the second cover portion along the first direction;
   a backlight over the cover bottom and including a light source, a diffusion plate, and an optical sheet;

a support member that maintains a selected distance between the light source and the diffusion plate and includes a first support portion and a second support portion;
a liquid crystal panel over the backlight and the support member;
a screw coupled to the support member and the cover bottom;
wherein a position of the at least one of the plurality of protrusions corresponds to a position of the screw.

2. The liquid display device of claim 1, wherein the second cover portion is disposed between adjacent protrusions of the plurality of protrusions.

3. The liquid display device of claim 1, wherein the first cover portion has a cover groove between the second cover portion and the at least one of the plurality of protrusions.

4. The liquid display device of claim 1, wherein the first support portion has a first support groove corresponding to the second cover portion.

5. The liquid display device of claim 4, wherein the at least one of the plurality of protrusions is disposed between adjacent first support grooves of the first support portion.

6. The liquid display device of claim 4, wherein the first support portion further has a second support groove corresponding to an edge of the light source.

7. The liquid display device of claim 1, wherein the end of the at least one of the plurality of protrusions extend past an outer surface of the second support portion that is in the second plane.

8. The liquid display device of claim 1, further comprising a guide panel between the backlight and the liquid crystal panel,
wherein the guide panel includes:
a first guide portion that extends in the first direction; and
a second guide portion that extends in the second direction, and
wherein the plurality of protrusions partially overlap the second guide portion.

9. The liquid display device of claim 1, wherein the first cover portion has a cover hole corresponding to the screw, and the first support portion has a support hole corresponding to the cover hole, and
wherein a press-fit nut is positioned in the cover hole and the support hole.

10. The liquid display device of claim 9, wherein the support hole has a first hole part and a second hole part, and
wherein an area of the first hole part is larger than an area of the second hole part, and an inner side of the first hole part is open on at least one side.

11. A display device, comprising:
a cover bottom;
a support member on the cover bottom, the support member including:
a first support portion that extends in a horizontal direction; and
a second support portion that extends in a vertical direction;
a backlight including:
a light source positioned under and coupled to a first surface of the first support portion; and
a diffusion plate positioned over and coupled to a second surface of the first support portion;
a display panel over the backlight and the support member; and
a screw that fastens the support member to the cover bottom.

12. The display device of claim 11, wherein the first support portion has an inclined surface that extends from the diffusion plate to the light source.

13. The display device of claim 11, wherein the cover bottom includes a cover hole corresponding to the screw, the first support portion includes a support hole corresponding to the cover hole, and the screw is exposed to space between the light source and the diffusion plate by the support hole.

14. A display device, comprising:
a cover bottom including:
a first cover portion that extends in a first direction and a second direction that is transverse to the first direction, the first cover portion having a protrusion in the first direction;
a second cover portion that extends in a third direction, transverse to the first direction and the second direction, wherein the protrusion extends in the first direction beyond an outer surface of the second cover portion; and
a cover groove that separates the second cover portion from the protrusion in the second direction;
a backlight over the cover bottom and including a light source, a diffusion plate, and an optical sheet;
a support member that maintains a selected distance between the light source and the diffusion plate, the support member including a support hole that overlaps the protrusion;
a display panel over the backlight and the support member; and
a screw that extends through the support hole and fastens the support member to the cover bottom.

15. The display device of claim 14, wherein the cover bottom includes a cover hole under the support hole, and the screw extends through the cover hole.

16. The display device of claim 14, wherein the protrusion extends past the support member in the first direction.

17. The display device of claim 14, further comprising a guide panel, coupled to both the second cover portion and the support member.

18. The display device of claim 14, wherein the support member is coupled to both the diffusion plate and a reflection plate positioned on the light source.

19. The display device of claim 18, wherein the support member has an inclined surface that extends from the diffusion plate to the reflection plate.

20. The display device of claim 14, wherein the cover groove is part of a plurality of cover grooves, and the screw is positioned between two cover grooves in the plurality of cover grooves.

21. The display device of claim 1, wherein the first support portion has a support hole corresponding to the screw,
wherein the support hole has a first hole part and a second hole part between the first hole part and the first cover portion, and
wherein an area of the first hole part is larger than an area of the second hole part.

22. The display device of claim 21, wherein the screw includes a screw head in the first hole part and a screw body in the second hole part, and
wherein the screw head is positioned between the liquid display panel and the first cover portion.

23. The display device of claim 22, wherein the first cover portion has a cover hole under the support hole, and the screw body extends through the cover hole.

* * * * *